(12) United States Patent
de Jong

(10) Patent No.: US 6,366,850 B1
(45) Date of Patent: Apr. 2, 2002

(54) METHOD FOR NAVIGATING A VEHICLE

(75) Inventor: Cornelis Dick de Jong, Helmond (NL)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/657,077

(22) Filed: Sep. 7, 2000

(30) Foreign Application Priority Data

Sep. 21, 1999 (DE) .......................................... 199 45 120

(51) Int. Cl.$^7$ .............................................. G01C 21/20
(52) U.S. Cl. ........................ 701/207; 342/357; 342/419; 455/12.1; 701/213; 701/210; 701/216; 701/220; 340/988; 340/990
(58) Field of Search ................................. 701/207, 214, 701/217, 213; 342/457, 358, 357, 359; 340/991; 33/556

(56) References Cited

U.S. PATENT DOCUMENTS

| 5,440,484 A | * | 8/1995 | Kao ............................ 701/224 |
| 5,572,217 A | * | 11/1996 | Flawn ......................... 342/357 |
| 5,877,723 A | * | 3/1999 | Fan ............................. 342/357 |
| 5,928,309 A | | 7/1999 | Korver et al. ................ 701/214 |
| 6,185,503 B1 | * | 2/2001 | Sumizawa ................... 701/209 |

FOREIGN PATENT DOCUMENTS

| DE | 42 08 158 C2 | 9/1992 | ............. G01S/5/02 |

OTHER PUBLICATIONS

Japan Abstract: JP0030245075AA; Oct. 31, 1991 (in English).
Japan Abstract: JP0030245076AA; Oct. 31, 1991 (in English).

* cited by examiner

Primary Examiner—William A. Cuchlinski, Jr.
Assistant Examiner—Tuan C To
(74) Attorney, Agent, or Firm—David M. Thimmig; Mayer, Brown, Rowe & Maw

(57) ABSTRACT

The invention specifies a method for navigating a vehicle, in which a change in the vehicle's direction is ascertained by integration of a signal indicating a speed of change in direction. To this end, the result of the integration is corrected by the following steps: a) The absolute direction of the vehicle at a first instant is determined using external auxiliary means; b) The absolute direction of the vehicle at a second instant is determined using external auxiliary means; c) The difference between the absolute directions is ascertained; and d) The result of the integration is normalized to this difference. The method enables the determination of directions more accurately.

12 Claims, 1 Drawing Sheet

METHOD FOR NAVIGATING A VEHICLE

BACKGROUND OF THE INVENTION

The invention relates to a method for navigating a vehicle, in which a change in the vehicle's direction is ascertained by integration of a signal indicating a speed of change in direction.

Such a method is used in a "Carin" navigation system, for example.

The demand for navigation aids has increased continuously in recent years. The aim here is to be able to indicate to the driver of a motor vehicle the best possible route for him to be able to reach the destination from a starting location. In this context, the overall task is divided into three parts, namely determining the position of the vehicle, route planning, and transmitting the route to the driver. The present invention relates to the first part, namely determining the position of the vehicle.

To determine the position of the vehicle, navigation satellites forming part of a global positioning system, or GPS, have been available for some time. Although the satellites can be used everywhere to determine a location or position with few restrictions, the accuracy which they are able to achieve is only within a range of 100 m. For inter-urban journeys, this may be sufficient in most cases. However, this "inaccuracy" is critical where the distance between roads is less than this magnitude, for example, in towns or at traffic junctions, where a number of roads meet one another within a relatively short distance.

Hence, in particular fields, the use of "compound navigation" has taken over, where the position of the vehicle is determined by ascertaining the direction and distance from a starting point. The current position of the vehicle is thus ascertained by a type of vector addition. Such a method is also called dead reckoning. However, in this method, errors which arise in the case of any vector formation add up, which means that there also is the risk of not being able to determine the position of the vehicle with the desired degree of accuracy.

For direction determination, gyroscopes are used in the known case. Gyroscopes produce an output signal for which the term "drift" has been introduced when the vehicle is traveling in a straight line or is at a standstill (no change in direction). When the vehicle changes direction, a change in the output signal is produced which is dependent on the angular speed $\omega$ of the vehicle. By integrating this signal over time, the change in direction can be ascertained.

A gyroscope can have, by way of example, an output voltage range of between 0 and 5 V, with an output voltage (drift) of 2.5 V being output in the neutral position, i.e., when the vehicle is traveling in a straight line or is at a standstill. The change in the output signal on the basis of the angular speed, i.e., mV/(°/s), is called the sensitivity.

To date, a fixed value has been assumed for the sensitivity, for example, 25 mV for 1°/sec. Although this assumption was correct in many cases, it is possible to observe that the sensitivity is subject to relatively great variation for different gyroscopes and is also dependent on the inclination of the gyroscope on the basis of the installation position. In this context, the variation range can be above 10%.

It is easy to see that ascertainment of the direction becomes relatively inaccurate when the vehicle has passed through a plurality of circles on the entrance ramp to a multistory car park, i.e., has executed rotations through a multiple of 360°. A directional error of 90° can easily arise in this case.

SUMMARY OF THE INVENTION

The invention is based on the object of being able to determine directions more accurately. This object is achieved for a method of the type mentioned above by virtue of the feature that the result of the integration is corrected by the following steps:

a) The absolute direction of the vehicle at a first instant is determined using external auxiliary means;

b) The absolute direction of the vehicle at a second instant is determined using external auxiliary means;

c) The difference between the absolute directions is ascertained; and d) The result of the integration is normalized to this difference.

In this case, steps a–c do not need to be carried out for each change in direction. External auxiliary means are to be understood as meaning those which have no influence on the gyroscope or on a comparable unit and are not influenced by the gyroscope. The difference between the two absolute directions can be determined relatively accurately. If the sensitivity is correct, the result of the integration ought to correspond to this difference in direction. If this is not the case, a correction variable can be formed, for example, by multiplying the correction variable used hitherto by the quotient of the difference between the absolute directions and the integration result. Such calibration can be performed during the journey, since the vehicle changes direction relatively often in this case. This also makes it possible to allow for influencing factors which change the sensitivity during the journey. Calibration can be performed using relatively few additional steps, which means that the processing complexity for the navigation system remains low. In addition, the advantage is obtained that this calibration also makes it possible to allow for the influence of the installation position of the gyroscope on its output signal.

The external auxiliary means used are preferably satellites. Although position determination using satellites is relatively inaccurate, as indicated above, direction determination using satellites is much more accurate. The signal from the navigation satellites is usually evaluated at an interval of one second, that is to say at a frequency of 1 Hz. It can thus be assumed that the systematic position determination error has not essentially changed in this short period of time, which means that the error is eliminated when a difference is formed between two positions. The direction with respect to the satellites can also be determined relatively easily by means of the Doppler effect.

As an alternative or in addition to this, the external auxiliary means used can be roads on which the vehicle is depicted. This procedure, i.e., the depiction, is also known as map matching. In this context, it is assumed that a vehicle will, with a relatively high degree of probability, be moving on a road situated close to positions which, by way of example, have been ascertained by compound navigation or using satellites. In many cases, this procedure provides sufficiently accurate statements, at least for direction determination, because the direction of the road is fixed.

The roads are preferably stored in a database. This simplifies evaluation using a computer which is required anyway for evaluating the other data arising during navigation.

The correction variable is advantageously ascertained only if the difference between the absolute directions is at least 60°. In this case, the result of the integration is large enough for, by way of example, an error no longer to be of any relatively great significance. Direction changes with a difference of at least 60° arise when the vehicle turns at right angles, for example. Relatively large direction changes arise, for example, when the vehicle wants to turn left at a highway interchange. Since it is not possible to cross the opposite side of the highway, the vehicle usually needs to change direction through 270° in this case.

Preferably, the correction variable is ascertained only if a predetermined average angular speed is not undershot in the period of time between the first instant and the second instant. By way of example, calibration is interrupted if the average angular speed is lower than 1°/sec. In this case, the risk of drift discrepancies having a negative effect on ascertainment of the correction variable is reduced.

The correction variable is preferably filtered. The influence of a currently ascertained correction variable is then always put in a relatively large context, so that "outliers", for example, do not have too negative an effect. In the case of such filtering, it is also possible to ensure that correction variables ascertained after a large change in direction are given greater weight than correction variables ascertained after a small change in direction.

BRIEF DESCRIPTION OF THE DRAWINGS

The invention is described in more detail below with the aid of a preferred illustrative embodiment in conjunction with the drawing, in which.

DETAILED DESCRIPTION OF THE PREFERRED EMBODIMENT

Figure 1:
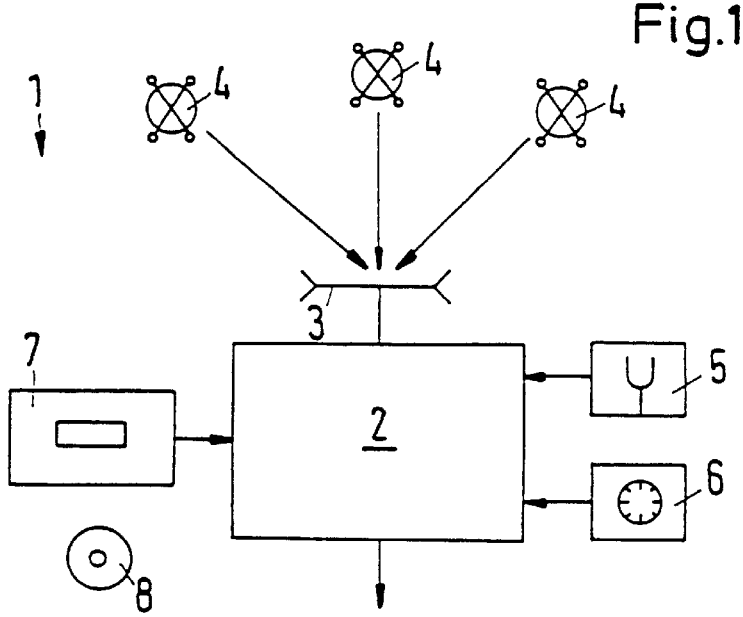
FIG. 1 shows a schematic illustration of a navigation system.

In FIG. 1, a system 1 for navigating a vehicle is shown with just one part, which is concerned with position determination. A processing device 2 is connected to an antenna 3 which receives signals from navigation satellites 4. Using satellites, the positions and directions are ascertained at an interval of one second, that is to say at a frequency of 1 Hz. The delay time of signals can be used to calculate the distance from the satellites 4. If the distance from at least three satellites is known, then it is possible to calculate the position of the vehicle on the earth. This position is subject to certain errors, however.

Figure 3:
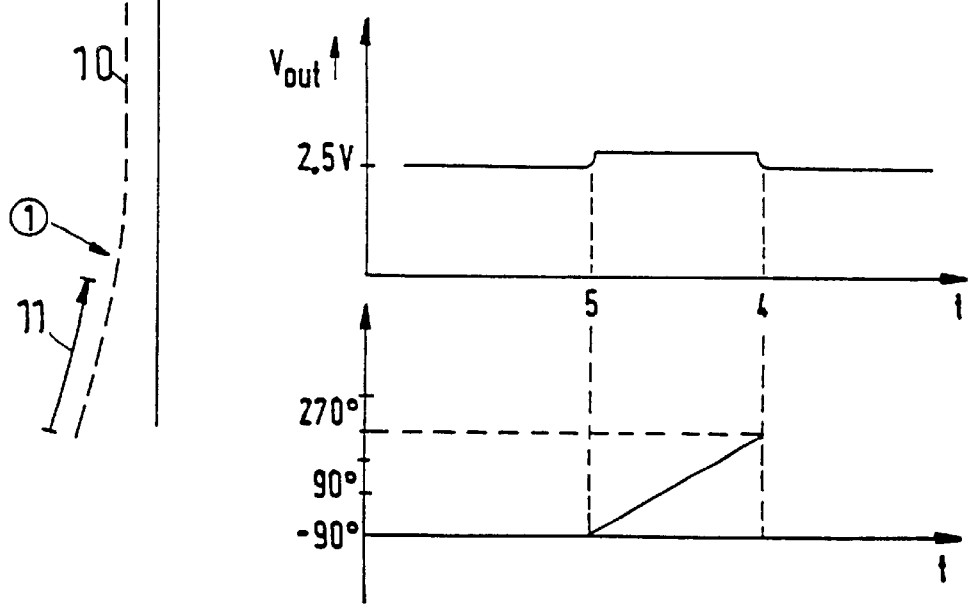
FIG. 3 shows some signal profiles.

In addition, the processing device 2 is connected to a schematically illustrated gyroscope 5, whose output signal is shown in FIG. 3 (top graph). Finally, a tachometer 6 is also connected to the processing device and informs the processing device 2 of the distance covered.

The processing device 2 is connected to a database 7 (likewise illustrated schematically) which may also be formed by a reader for a data medium 8, for example a CD-ROM. The database 7 can store data about roads such that they can be utilized by the processing device 2, for example a computer. The processing device 2 can, by way of example, depict the current position of the vehicle on the road on which the vehicle is currently situated. This procedure is also called map matching. The database 7 is also used for route planning, but this is of secondary importance in the present case.

To determine the location or position of the vehicle, the system makes considerable use of so-called compound navigation, which is also referred to as dead reckoning. The system ascertains what distance is being covered by the vehicle and in which direction, starting from a known location. The distance is ascertained using the tachometer 6, and the direction is ascertained using the gyroscope 5. The current position of the vehicle can be determined by vectorial addition of the individual distances in one direction.

When the vehicle is traveling in a straight line, the gyroscope 5 outputs a constant voltage of 2.5 V, for example. This constant output voltage of the gyroscope 5 is also called drift.

When the direction of the vehicle changes, the output voltage of the gyroscope 5 also changes. The discrepancy between the output signal and its "quiescent value" depends on the speed at which the vehicle changes direction. This angular speed dependency is called sensitivity. In more apt terms, the sensitivity normalizes the discrepancy in the output signal to an angular speed. If this discrepancy is integrated overtime, as shown at the bottom of FIG. 3, a statement is obtained about the angle covered.

Figure 2:
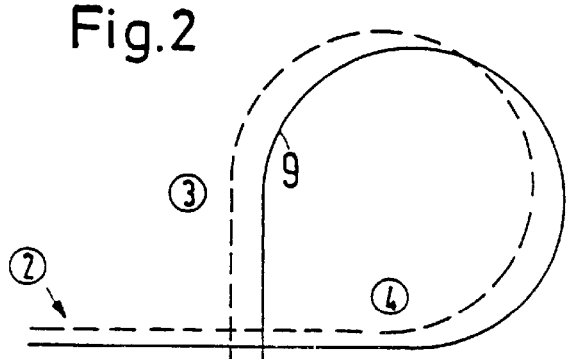
FIG. 2 shows an illustrative section of journey to explain the procedure.

FIG. 2 shows an example of the course of a road 9. Such a road course occurs at a highway interchange, for example, at which a vehicle traveling north wants to turn off to the west. It is assumed that the vehicle is on the road 9.

A course 10 calculated by the processing device 2 using compound navigation is shown in dashes. A number of inaccuracies and errors which have arisen during this calculation mean that the course 10 does not match the road 9 precisely. In particular, in a section 11, it can be seen that the direction of the course 10 does not match the direction of the road 9.

At an instant ①, the direction of the vehicle is now determined using the satellites 4. This value is assumed to be an absolute direction. The compound navigation of the processing device 2 now assumes this value to be a new direction. The vehicle then passes through a bend of 270°. At an instant ②, the direction is again determined using the satellites 4. The compound navigation in the processing device is again set to this new direction value.

The rotation through 270° starts at instant ③ and ends at instant ④. As can be seen from FIG. 3, the output voltage of the gyroscope 5 changes between the first instant ③ and the second instant ④. Specifically, the output voltage rises from 2.5 V to 2.6 V. Plotted below that is the integrated output signal, which will accordingly indicate 270°.

The absolute direction was determined at instants ① and ②, specifically using means which are neither influenced by the gyroscope 5 nor influence same. If the scaling factor S of the gyroscope 5 is correct, then, after integration, an output value of 270° will likewise be produced for the selected example.

It is then possible to ascertain a new scaling factor $S_{new}$ from the previously used scaling factor $S_{old}$, from the value A ascertained from the difference in absolute direction, and from the direction difference resulting from the integration result I by forming $$S_{new} = S_{old} \cdot \frac{-A}{I}$$

The value $S_{new}$ can then also be filtered by using the filter function below, for example $$S_{filter} = \left(1 - e^{\frac{-A}{\psi}}\right) \cdot S_{new} + e^{\frac{-A}{\psi}} S_{old}$$

In this context, a more or less freely selectable reference angle, which is 1000°, for example, is prescribed for ψ. This means that the variable for the direction change can also be included in the weighting, i.e. if the bend taken is larger, $S_{new}$ also has a greater weight on $S_{filter}$.

Various conditions can now also be provided which need to be satisfied so that the scaling factor S, which can also be called the correction variable, can be ascertained at all. By way of example, the bend taken needs to enclose an angle of 60° or more. Between the first instant ① and the second instant ②, the average angular speed must not be lower than a predetermined value. If this value is 1°/sec., for example, the total direction change needs to be at least 60° if the time difference is 60 sec.

What is claimed is:

1. A method for navigating a vehicle, in which a change in the vehicle's direction is ascertained by integration of a signal indicating a speed of change in direction, wherein the result of the integration is corrected by the following steps:
   a) the absolute direction of the vehicle at a first instant is determined using external auxiliary means;
   b) the absolute direction of the vehicle at a second instant is determined using external auxiliary means;
   c) the difference between the absolute directions is ascertained;
   d) the result of the integration is normalized to this difference; and
   e) a new scaling factor is ascertained from a previously used scaling factor by using the difference between the absolute directions and the result of the integration.

2. The method as claimed in claim 1, wherein the external auxiliary means used are satellites.

3. The method as claimed in claim 2, wherein a correction variable is ascertained only if the difference between the absolute directions is at least 60°.

4. The method as claimed in claim 3, wherein the correction variable is ascertained only if a predetermined angular speed is not undershot in the period of time between the first instant and the second instant.

5. The method as claimed in claim 3, wherein the correction variable is filtered.

6. The method as claimed in claim 4, wherein the correction variable is filtered.

7. The method as claimed in claim 1, wherein the external auxiliary means used are road data of an electronic map.

8. The method as claimed in claim 7, wherein the road data are stored in a database.

9. The method as claimed in claim 8, wherein a correction variable is ascertained only if the difference between the absolute directions is at least 60°.

10. The method as claimed in claim 9, wherein the correction variable is ascertained only if a predetermined angular speed is not undershot in the period of time between the first instant and the second instant.

11. The method as claimed in claim 9, wherein the correction variable is filtered.

12. The method as claimed in claim 10, wherein the correction variable is filtered.

* * * * *